United States Patent [19]
Goi et al.

[11] Patent Number: 5,782,433
[45] Date of Patent: Jul. 21, 1998

[54] ENGINE DECELERATION DEVICE AND POWER TRANSMISSION DEVICE FOR HELICOPTERS

[75] Inventors: Tatsuhiko Goi; Nobuyoshi Yamauchi; Eiichi Yamakawa, all of Kakamigahara, Japan

[73] Assignee: Advanced Technology Institute of Commuter-Helicopter, Ltd., Gifer, Japan

[21] Appl. No.: 615,786

[22] Filed: Mar. 12, 1996

[30] Foreign Application Priority Data

Apr. 27, 1995 [JP] Japan .................. 7-104362

[51] Int. Cl.$^6$ .................. B64C 27/58
[52] U.S. Cl. .................. 244/60; 475/216; 74/665 M
[58] Field of Search .................. 74/665 M, 665 N; 475/192, 330, 216; 416/170 R; 244/60, 17.11; 477/31

[56] References Cited

U.S. PATENT DOCUMENTS

| | | | |
|---|---|---|---|
| 717,225 | 12/1902 | Lewis | 475/192 |
| 766,757 | 8/1904 | Crane | 475/192 |
| 1,856,383 | 5/1932 | Gerdes | 475/192 |
| 2,100,632 | 11/1937 | Chilton | 475/192 |
| 3,574,289 | 4/1971 | Scheiter et al. | 477/31 |
| 3,977,632 | 8/1976 | Watson | 244/60 |
| 4,464,952 | 8/1984 | Stubbs | 475/216 |
| 4,479,619 | 10/1984 | Saunders et al. | 244/60 |
| 4,632,337 | 12/1986 | Moore | 244/17 |
| 4,768,398 | 9/1988 | Greenwood | 475/216 |
| 5,090,951 | 2/1992 | Greenwood | 475/216 |
| 5,139,466 | 8/1992 | Perry | 475/216 |
| 5,214,973 | 6/1993 | Hambric | 476/69 |
| 5,232,414 | 8/1993 | Fellows et al. | 475/216 |
| 5,271,295 | 12/1993 | Marnot | 74/665 |

FOREIGN PATENT DOCUMENTS

| | | | |
|---|---|---|---|
| 0084724 | 8/1983 | European Pat. Off. | F16H 37/08 |
| 2261179 | 9/1975 | France | B64D 35/08 |
| 4287799 | 10/1992 | Japan | B64C 27/58 |
| 4306196 | 10/1992 | Japan | B64C 27/59 |
| 5139386 | 6/1993 | Japan | B64C 27/04 |
| 5149351 | 6/1993 | Japan | F16D 41/06 |

*Primary Examiner*—Dirk Wright
*Attorney, Agent, or Firm*—Baker & Botts, L.L.P.

[57] ABSTRACT

Each engine is directly coupled to an engine deceleration device composed of a traction speed change mechanisms and a planetary speed change mechanism, and is decelerated at a desired speed change ratio, and rotate and drive a collector gear and a main rotor shaft. The collector gear rotates and drives accessories and a tail rotor through a second traction speed change mechanism changing speed in inverse number of the speed change ratio of the traction speed change mechanisms. Thus, the rotating speed of the engines can be continuously decelerated at an arbitrary speed change ratio, and an engine deceleration device of small size, light weight, and low loss is realized. At the same time, a power transmission device for helicopters capable of changing the rotating speed of the main rotor at a constant engine rotating speed is realized.

1 Claim, 6 Drawing Sheets

FIG. 3A
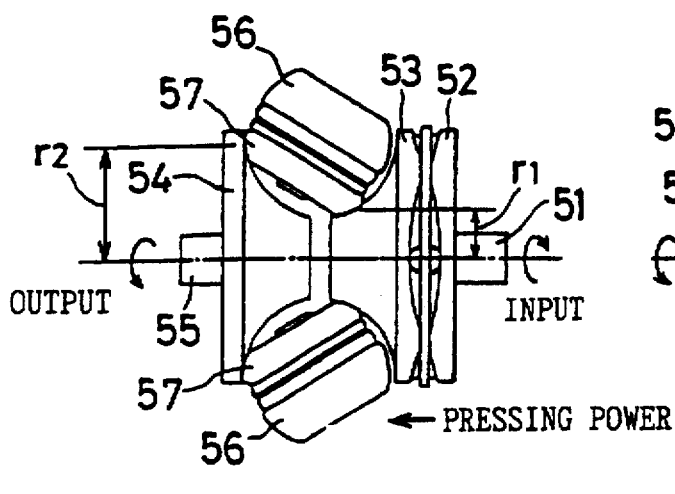
SPEED CHANGE RATIO = r1/r2
FIG. 3B
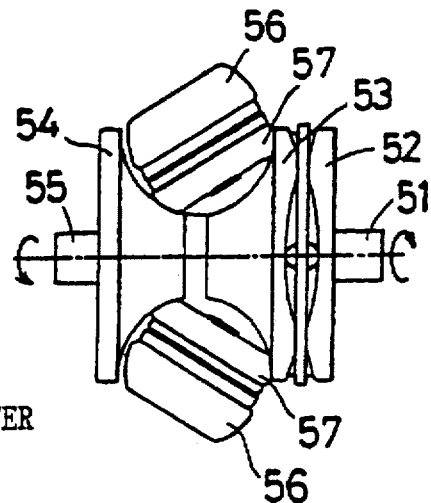
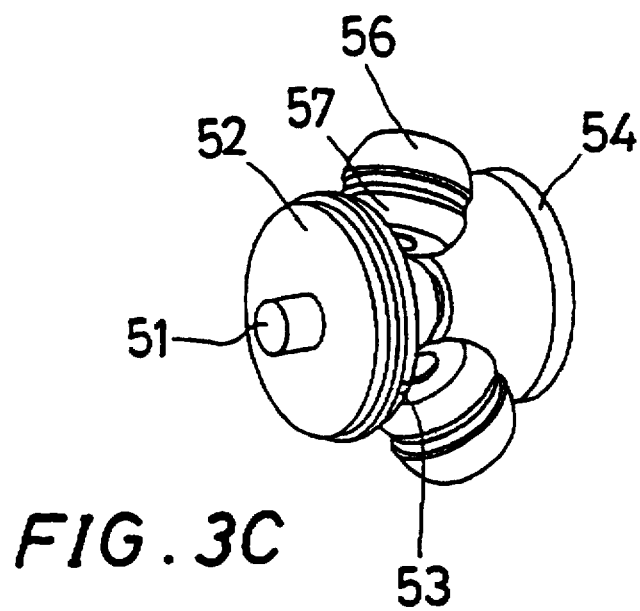
FIG. 3C

ENGINE DECELERATION DEVICE AND POWER TRANSMISSION DEVICE FOR HELICOPTERS

BACKGROUND OF THE INVENTION

1. Field of the Invention

The present invention relates to an engine deceleration device capable of reducing the number of rotations of an engine output shaft continuously and variably. The invention also relates to a power transmission device for helicopters for continuously varying the rotating speed of a main rotor over a wide range.

2. Description of the Related Art

Recently the demand for a commuter helicopter which lands and takes off in an urban heliport is increasing, and noise reduction is required for realizing such a commuter helicopter. One of the effective means as countermeasures is to slow down the rotating speed of the main rotor.

FIG. 6 is a perspective view showing an example of a power transmission mechanism for a conventional helicopter. The main rotor is fixed on an extension of a main rotor shaft 14, and a tail rotor is fixed on an extension of a tail rotor shaft 18. The output shafts of a pair of engines 1, 2 rotate at 20,000 to 30,000 rpm, and are reduced to about 6,000 rpm by gear boxes 3, 4, and are coupled to spiral bevel gears 7, 8 through freewheel clutches 5, 6 and are further engaged with one collector gear 13, thereby rotating and driving the main rotor shaft 14 at about 350 rpm. The gear boxes 3, 4 directly coupled with the output shafts of the engines 1, 2 have a constant reduction ratio.

Relating to peripheral accessories, a lubricating oil pump is driven by spiral bevel gears 7, 8, and a hydraulic pump is driven through transmission shafts 9, 10, and a cooling fan is driven through a transmission shaft 11.

On the other hand, a gear 15 is engaged with the collector gear 13 and coupled with three tail rotor shafts 16, 17 and 18 so as to divide the torque of the collector gear 13, thereby rotating and driving the tail rotor at about 2,200 rpm.

As other prior arts, Japanese Unexamined Patent Publications JPA 4-287799(1992), JPA 4-306196(1992), JPA 5-139386(1993), and JPA 5-149351(1993) are known.

In conventional helicopters, since revolution of the engines 1, 2 is slowed down at a fixed reduction ratio by different gear trains of the gear boxes 3, 4, the main rotor and tail rotor can rotate only at a constant rotating speed.

Accordingly, in order to decrease the rotating speed of the main rotor to reduce noise, it is necessary to lower the engine speed. However, since a conventional engine is designed so as to arrive its maximum performance at a predetermined engine speed, it is difficult to control the engine speed unrestrictedly, and the engine speed can be lowered by at most only about 3%. Additionally, it may be considered to control the engine speed by optimizing the fuel flow rate and ignition timing by electronic control of the engine, but other problems such as lowered efficiency and generation of resonance, and allowable strength of transmission system are involved, and at the present the engine speed can be varied by only a small percent in practically. Besides, if the rotating speed of the main rotor is lowered excessively, the lift may drop, and the flight performance of the helicopter may be lowered.

It is hence a more practical manner to lower the rotating speed of the main rotor over urban districts to reduce noise, and return the rotating speed of the main rotor to an optimum over rural districts so as to fly at its maximum performance. For example, it is reported that the equivalent weight noise level is lowered by 3 dB to 5 dB by lowering the main rotor speed or the wing end speed by 10%.

SUMMARY OF THE INVENTION

It is hence an object of the invention to provide an engine deceleration device of small size, light weight, and low loss, capable of steplessly decelerating engine speed at an arbitrary speed change ratio.

It is another object of the invention to provide a power transmission device for helicopters, capable of continuously changing the rotating speed of a main rotor over a wide range, for example, of 0 to 30% or more, while keeping engine speed constant.

The invention provides an engine deceleration device comprising a traction speed change mechanism of continuously variable speed change ratio, directly coupled to an output shaft of an engine.

According to the invention, a traction speed change mechanism of continuously variable speed change ratio, directly coupled with the output shaft of the engine realizes an engine deceleration device of small size, light weight, and low loss. Such traction speed change mechanism is composed of a half toroidal type CVT (continuously variable transmission), a full toroidal CVT or the like, and by directly coupling such a speed change mechanism with the transmission shaft rotating at high speed such as the output shaft of the engine, the maximum allowable torque becomes small, and hence that contributes to reduction in size and weight of the engine deceleration device. Moreover, by mounting such an engine deceleration device in a helicopter or a tilt rotor aircraft, noise reduction and improved flight performance may be achieved.

The invention also provides a power transmission device for helicopters comprising:

a traction speed change mechanism of continuously variable speed change ratio, directly coupled with an engine output shaft, a collector gear driven by output torque outputted from the traction speed change mechanism, and a main rotor shaft for rotating and driving a main rotor, directly coupled with the collector gear.

According to the invention, moreover, by directly coupling the traction speed change mechanism of continuously varying variable speed change ratio with the output shaft of the engine, the rotating speed of the main rotor can be continuously decreased or increased, while keeping the rotating speed of the engine constant. Accordingly, even under the condition that the engine performance is brought out up to the maximum extent, the noise can be reduced by decreasing the main rotor rotating speed, and to the contrary, since the rotating speed of the main rotor is increased, the motion performances (swivel, acceleration, ascending rate, elevated plate performances, etc.) of the helicopter may be improved.

Further in the power transmission device for helicopters of the invention, it is preferable that the power transmission device for helicopters further comprises a second speed change mechanism coupled with the collector gear, in which speed change is carried out at the inverse ratio of the speed change ratio of the traction speed change mechanism, and a tail rotor and accessories driven by output torque from the second speed change mechanism.

Further according to the invention, since the collector gear is provided with the second speed change mechanism in which speed change is carried out at the inverse ratio of the speed change ratio of the traction speed change mechanism, and the tail rotor and the accessories including a lubricating oil pump, a hydraulic pump and a cooling fan are driven by the output torque from this second speed change mechanism, even if the rotating speed of the main rotor is changed by speed change control, as far as the engine rotates at a constant rotating speed, the tail rotor and accessories operate stably. In case one of a pair of engines fails to operate, the tail rotor and accessories can be driven by the other of the pair of engines, so that it is possible to continue to fly.

BRIEF DESCRIPTION OF THE DRAWINGS

Other and further objects, features, and advantages of the invention will be more explicit from the following detailed description taken with reference to the drawings wherein:

FIGS. 3A, 3B and 3C are views showing an example of traction speed change mechanisms 25, 27 and 28, FIGS. 3A and 3B being front views in deceleration and acceleration, respectively, FIG. 3C being a perspective view.

DETAILED DESCRIPTION OF THE PREFERRED EMBODIMENTS

Figure 1:
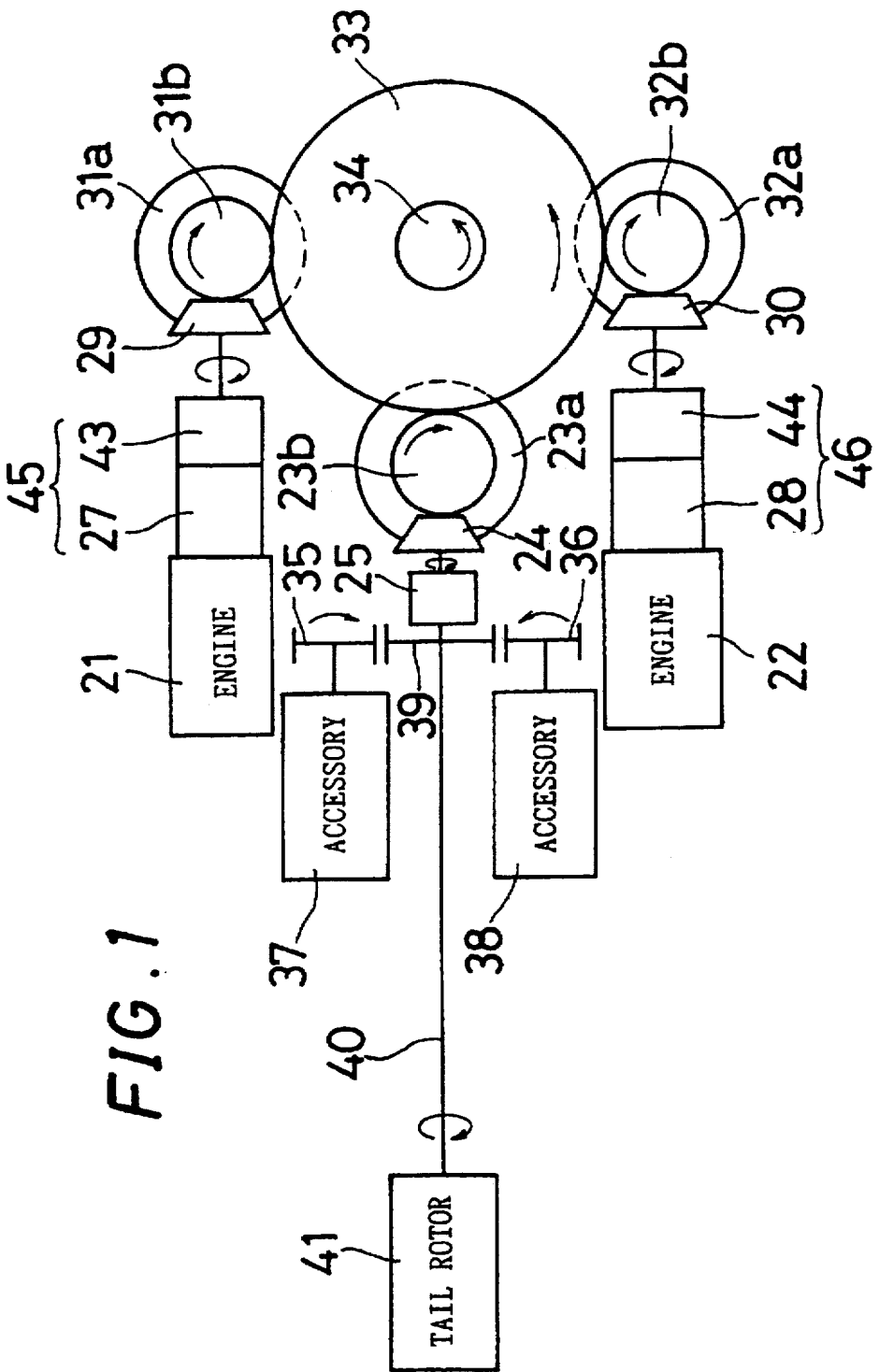
FIG. 1 is a structural view showing an embodiment of a power transmission device for helicopters of the invention.

Now referring to the drawings, preferred embodiments of the invention are described below.

FIG. 1 is a structural diagram showing an embodiment of a power transmission device for helicopters of the invention. Output shafts of a pair of engines 21 and 22 are directly coupled with engine deceleration devices 45 and 46 composed of traction speed change mechanisms 27 and 28 and planetary gear speed change mechanisms 43 and 44, respectively, and speed reduction is carried out at continuously variable speed change ratio. The output shafts of the planetary gear speed change mechanisms 43 and 44 are directly coupled with bevel gears 29, 30, respectively, and further engaged with bevel gears 31a and 32a to convert the direction of the rotating shaft. A gear 31b rotating integrally with the bevel gear 31a, and a gear 32a integrally rotating with the bevel gear 32b are engaged with a collector gear 33 to rotate and drive a main rotor shaft 34. In such a manner, under the state that the rotating speed of the engines 21 and 22 is maintained constant, the speed change ratio of the traction speed change mechanism 27 and 28 is adjusted, whereby the rotating speed of the main rotor coupled with the main rotor shaft 34 can be adjusted.

The collector gear 33 is engaged with a gear 23b, which rotates integrally with a bevel gear 23a. The bevel gear 23a is engaged with a bevel gear 24, which is coupled with a second traction speed change mechanism 25 in which speed change is carried out at the inverse ratio of the speed change ratio of the traction speed change mechanisms 27 and 28. The output shaft of the traction speed change mechanism 25 is coupled with a gear 39, which rotates and drives a tail rotor 41 through a tail rotor shaft 40, and is engaged with gears 35 and 36. The gears 35 and 36 drive accessories 37 and 38 including a lubricating oil pump, a hydraulic pump, and a cooling fan. In such a manner, the rotating speed changed by the traction speed change mechanisms 27 and 28 is returned to the initial rotating speed by the second traction speed change mechanism 25, and therefore the accessories 37, 38 and the tail rotor 41 can avoid adverse effects of main rotor speed change control, so that stable operation is realized.

Figure 2:
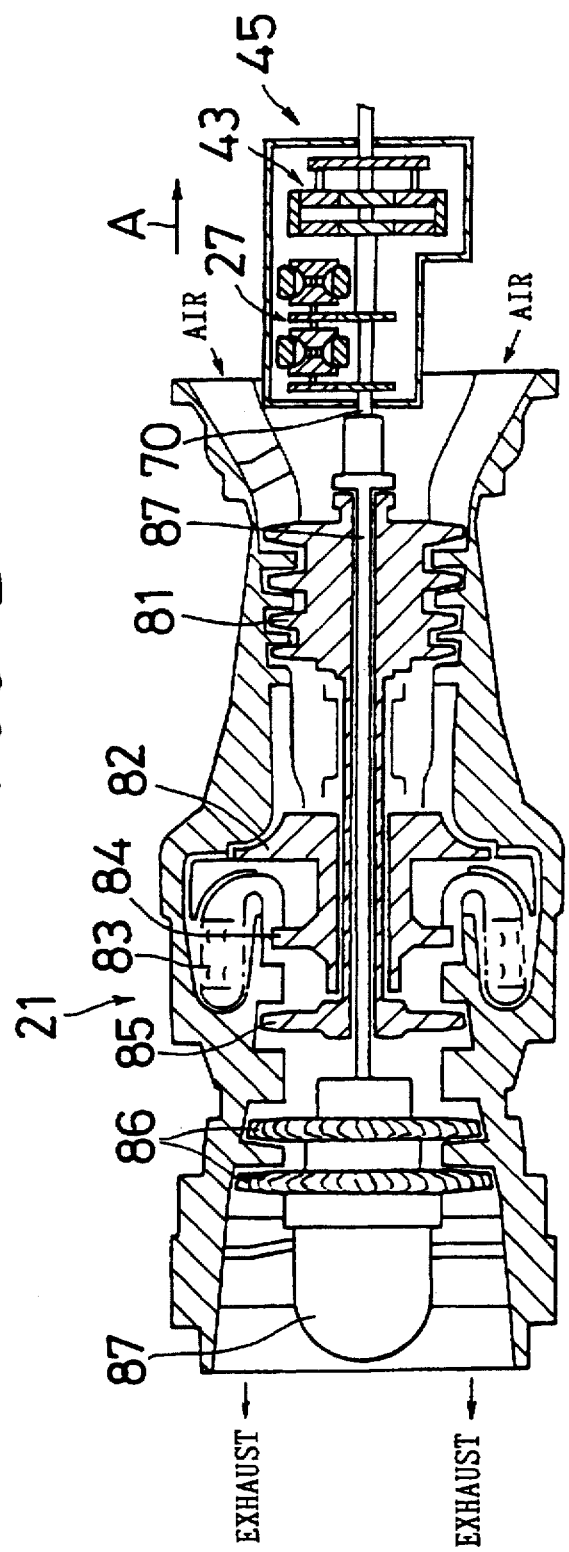
FIG. 2 is a sectional view of a turbo shaft engine mounting an engine deceleration device of an embodiment of the invention.

FIG. 2 is a sectional view of a turbo shaft engine mounting an engine deceleration device of an embodiment of the invention. Such a turbo shaft engine can be employed as engines 21 and 22 as shown in FIG. 1. Incidentally, since the engines 21 and 22 are mutually identical in constitution, only the engine 21 is shown in FIG. 21.

In FIG. 2, the air taken in from ahead in flying direction A is firstly compressed by an axial flow compressor 81, and the compressed air is further compressed by a centrifugal compressor 82 and fed into a combustor 83, where combustion of fuel is caused with the air fed into the combustor 83. The generated combustion gas of high temperature and high pressure in the combustor 83 rotates and drives high pressure turbines 84 and 85 and a low pressure turbine 86. The high pressure turbine 84 rotates and drives the centrifugal compressor 82, and the combustion gas in the high pressure turbine 84 is fed into the high pressure turbine 85. The combustion gas fed into the high pressure turbine 85 rotates and drives the axial flow compressor 81, and the combustion gas in the high pressure turbine 85 is fed into the low pressure turbine 86. The combustion gas fed into the low pressure turbine 86 rotates and drives an output shaft 87, and the combustion gas in the low pressure turbine 86 is exhausted from the rear of the engine. A shaft 70 directly coupled with the output shaft 87 is directly coupled with the engine deceleration device 45 composed of the traction speed change mechanism 27 and the planetary gear speed change mechanism 43, and decelerated at a desired speed change ratio.

FIGS. 3A, 3B and 3C show an example of traction speed change mechanisms 25, 27, and 28, FIG. 3 A and 3B being front views respectively in deceleration and acceleration, FIG. 3C being a perspective view. Although FIG. 3 shows an example of a half toroidal type CVT, full toroidal CVT and others may be applied to the invention.

In the half toroidal type CVT, an input shaft 51 is fixed to a pressurizing device 52, and rotates and drives an input disk 53 pressed by the pressurizing device 52. Inside of the input disk 53 and the output disk 54 are formed toroidal curve contact surfaces confronting each other. A transmission roller 57 contacts each contact surface of the input disk 53 and output disk 54, whereby traction drive is realized. The transmission roller 57 is rotatably supported by a trunnion 56 so as to tilt along the contact surface. The trunnion 56 is displaceable along the tilting axis direction (the vertical direction in the figures) of the transmission roller 57, and by adjusting the displacement amount, the tilting angle of the transmission roller 57 can be controlled.

Herein, supposing the contact radius of the transmission roller 57 and input disk 53 to be r1, and the contact radius of the transmission roller 57 and output disk 54 to be r2, the speed change ratio is given as r1/r2. In FIG. 3A, since r1<r2, the rotating speed of the output disk 54 decreases from the rotating speed of the input disk 53 to be in deceleration state. On the other hand, in FIG. 3B, since r1>r2, the rotating speed of the output disk 54 increases from the rotating speed of the input disk 53 to be in acceleration state. The output disk 54 decelerated or accelerated at a desired speed change ratio in such a manner is coupled with an external shaft through an output shaft 55.

In this way, since the traction speed change mechanism can adjust the speed change ratio continuously, and possesses a high transmission efficiency in a small and lightweight constitution, the traction speed change mechanism suits a speed change mechanism for helicopters which are strictly limited in weight.

Figure 4:
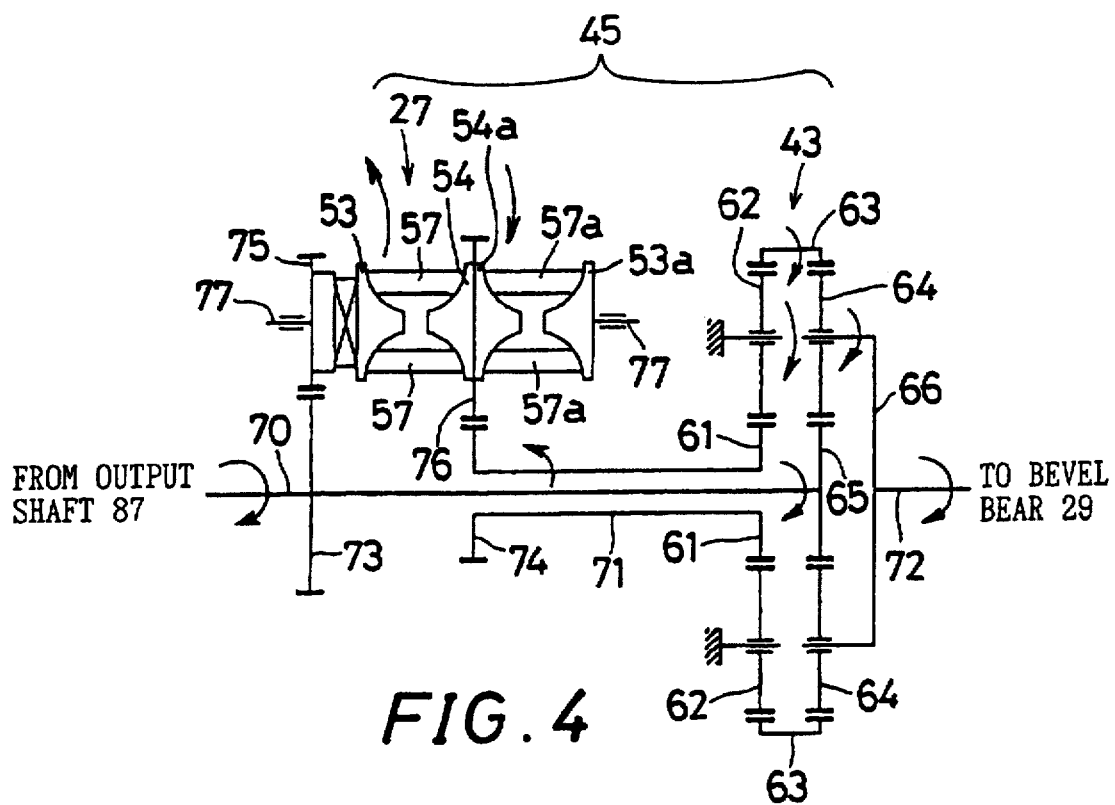
FIG. 4 is a structural view showing an example of an engine deceleration device 45.
Figure 5:
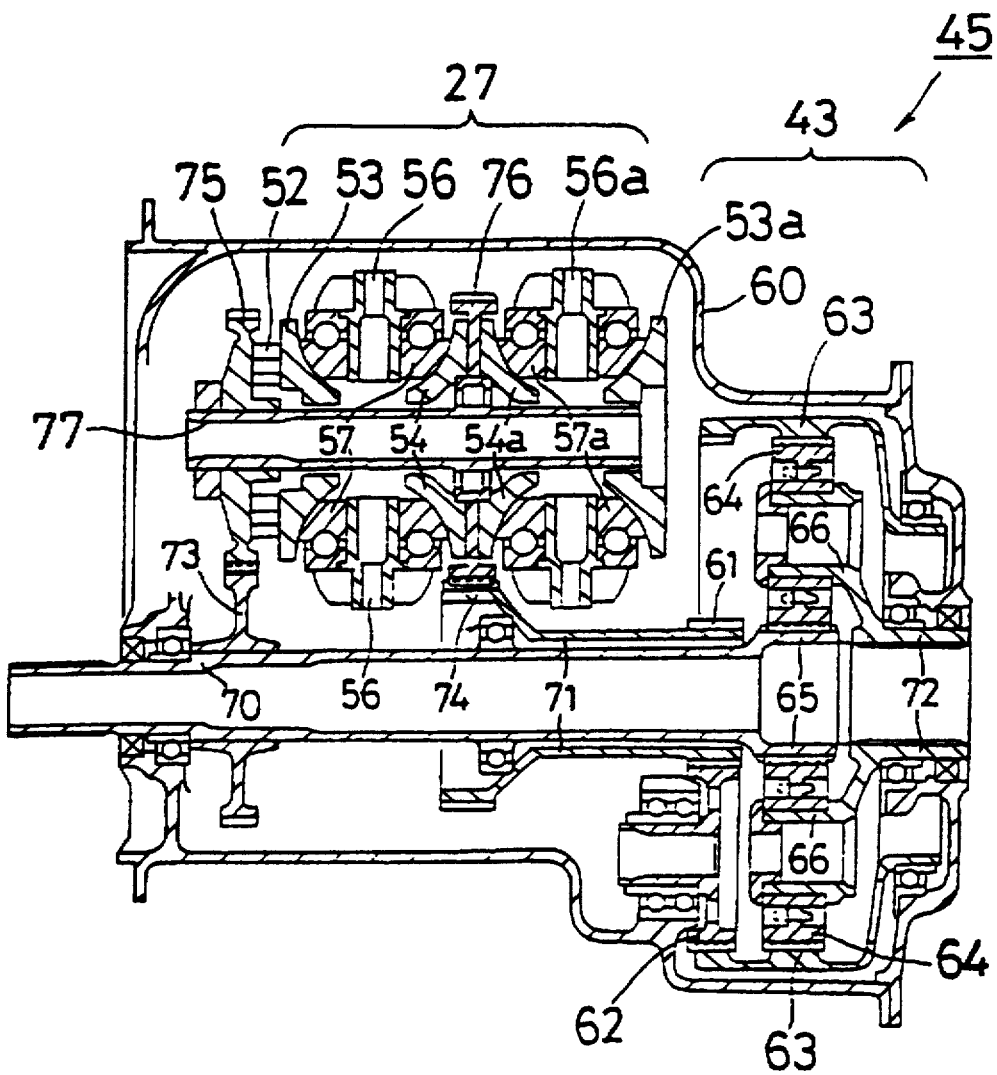
FIG. 5 is a sectional view showing details of the engine deceleration device 45 shown in FIG. 4.
Figure 6:
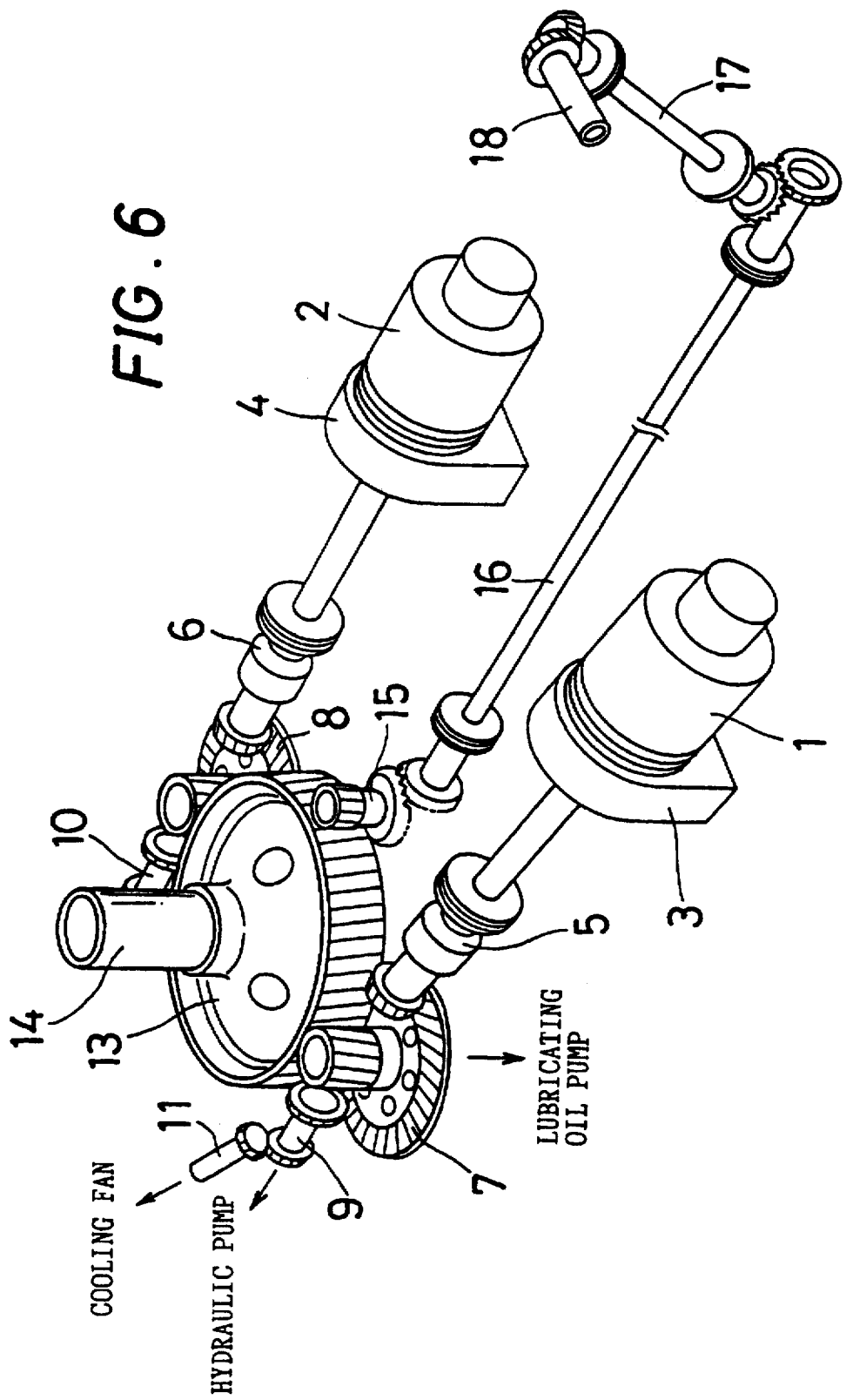
FIG. 6 is a structural view showing an example of a conventional power transmission mechanism for helicopters.

FIG. 4 is a structural view showing an example of the engine deceleration device 45, and FIG. 5 is a sectional view showing its details. The engine deceleration device 45 is composed of a traction speed change mechanism 27, a planetary gear speed change mechanism 43, and others, and another engine speed change device 46 is similarly constituted.

In FIGS. 4 and 5, the shaft 70 directly coupled to the output shaft 87 of the engine 21 is coupled with a second sun gear 65 to transmit the majority of the engine torque. Part of the torque of the shaft 70 is transmitted to a shaft 77 through gears 73 and 75 to be transmitted to input disks 53 and 53a. Furthermore, the torque of the input disks 53 and 53a is transmitted to the output disks 54 and 54a at a desired speed change ratio through transmission rollers 57 and 57a rotatably supported by trunnions 56 and 56a.

The output disks 54 and 54a are fixed on a gear 76, whose torque is transmitted to a gear 74 engaged with the gear 76 to be further transmitted to a first sun gear 61 coupled with a hollow shaft 71.

Next, in the planetary gear speed change mechanism 43, the torque of the first sun gear 61 is transmitted to a first planetary gear 62 engaged with the outer circumference of the first sun gear 61. The first planetary gear 62 is rotatably supported on a housing 60, shown in FIG. 5, and is engaged with inner teeth of a ring gear 63. Accordingly, the torque of the first sun gear 61 is directly transmitted to the ring gear 63, and further transmitted to a second planetary gear 64 engaged with other inner teeth. The second planetary gear 64 is engaged with a second sun gear 65, and the revolution speed of the second planetary gear 64 is determined depending on the rotating speeds of the second sun gear 65 and the ring gear 63. The revolutionary motion of the second planetary gear 64 is carried out by a carrier 66 and outputted from a shaft 72.

By thus driving the ring gear 63 by the traction speed change mechanism 27 of continuously variable speed change ratio, the speed change ratio of the planetary gear speed change mechanism 43 can be freely controlled. Hence, the majority of the engine torque can be transmitted through the planetary gear speed change mechanism 43, and the allowable transmission torque of the traction speed change mechanism 27 can be reduced.

Since the speed change of the planetary gear speed change mechanism is controlled by using such a traction speed change mechanism with variable speed change ratio, the load of the traction speed change mechanism is lowered, and a highly reliable power transmission mechanism is realized.

The foregoing description relates to an example of the engine deceleration device of continuously variable speed change ratio mounted in a helicopters, but it may be also applied to tilt rotor aircraft. A tilt rotor aircraft, which is a fixed wing aircraft in which an engine and a rotor are mounted at both ends of the main wing, possesses helicopter mode for taking off and landing vertically like a helicopter, and turboprop mode (aircraft mode) for flying at high speed over a long distance like a turboprop aircraft by deflecting the engine and the rotor in the horizontal direction during cruising.

Various manners for changing the rotor direction are known, and for example, in the tilt rotor aircraft called V-22 Osprey of Bell and Boeing, the engine is rotated together with the cell. In such tilt rotor aircraft, the rotating speed of the rotor differs between helicopter mode and turboprop mode. For example, supposing the rotating speed of the rotor in helicopter mode to be 100%, the rotating speed of the rotor in turboprop mode is set at about 80%.

When adjusting such rotor rotating speed, hitherto, the engine rotating speed has been directly controlled and there are drawbacks of poor fuel economy and lowered performance of auxiliary machinery. However, by mounting the engine deceleration device of continuously variable speed change ratio in the tilt rotor aircraft, adjustment of rotor rotating speed between helicopter mode and turboprop mode is made very easy. Additionally, in case of helicopters, the engine can be used in a high rotating speed range hitherto limited by the centrifugal force, so that the performance in high altitude is significantly enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A power transmission device for helicopters comprising:

a first traction speed change mechanism of continuously variable speed change ratio, coupled to an output shaft of an engine;

a collector gear driven by output torque from the first traction speed change mechanism;

a main rotor shaft for rotating and driving a main rotor which generates lift force, directly coupled to the collector gear;

a second traction speed change mechanism coupled to the collector gear, in which speed change is carried out at the inverse number ratio of the speed change ratio of the first traction speed change mechanism; and a tail rotor and accessories driven by output torque from the second traction speed change mechanism.

* * * * *